(12) United States Patent
Chua et al.

(10) Patent No.: US 7,451,136 B2
(45) Date of Patent: Nov. 11, 2008

(54) SYSTEM AND METHOD FOR SEARCHING MULTIPLE DISPARATE SEARCH ENGINES

(75) Inventors: Ghim-Sim Chua, Redmond, WA (US); Davide Massarenti, Redmond, WA (US); Sridhar Chandrashekar, Redmond, WA (US); Michael E. Meulemans, Renton, WA (US); Majeed D. Salman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 792 days.

(21) Appl. No.: 09/927,096

(22) Filed: Aug. 9, 2001

(65) Prior Publication Data

US 2002/0049756 A1    Apr. 25, 2002

Related U.S. Application Data

(60) Provisional application No. 60/239,804, filed on Oct. 11, 2000.

(51) Int. Cl.
G06F 7/00 (2006.01)
G06F 15/16 (2006.01)

(52) U.S. Cl. ............... 707/4; 707/3; 707/5; 707/10; 707/100; 709/217; 709/218; 709/219

(58) Field of Classification Search ............... 707/1–6, 707/10, 100–104.1; 709/217, 219, 223, 231, 709/245
See application file for complete search history.

(56) References Cited

U.S. PATENT DOCUMENTS 6,009,422 A * 12/1999 Ciccarelli ............... 707/4
6,263,342 B1 * 7/2001 Chang et al. ............. 707/103 R
6,275,820 B1 * 8/2001 Navin-Chandra et al. ...... 707/3
6,304,864 B1 * 10/2001 Liddy et al. ............... 706/15

(Continued)

FOREIGN PATENT DOCUMENTS

EP    1 072 984    * 10/2000

(Continued)

OTHER PUBLICATIONS

Hammer et al.—"Template-Based Wrappers in the TSIMMIS System"—1997 ACM (pp. 532-535).*

(Continued)

*Primary Examiner*—Jean Bolte Fleurantin
*Assistant Examiner*—Anh Ly
(74) *Attorney, Agent, or Firm*—Merchant & Gould; Ryan T. Grace

(57) ABSTRACT

Described is a system and method for searching multiple disparate search engines. More particularly, a search system provides search engine manager that operates to provide a standard interface with which one or more search engines may be queried through a search client. The search system being extensible, allows for the addition of search engines beyond the time of the initial construction of the search system. Each search engine, being wrapped around a COM (component object model) object, first registers with the search system through the wrapper, the wrapper providing communication between the search engine manager and the search engine. When initiated by a client, a query is transmitted to the search engines in series, the search engines execute the query in parallel, and the results are returned asynchronously to the client.

28 Claims, 6 Drawing Sheets

U.S. PATENT DOCUMENTS

| | | | | |
|---|---|---|---|---|
| 6,321,219 | B1* | 11/2001 | Gainer et al. | 707/3 |
| 6,327,590 | B1* | 12/2001 | Chidlovskii et al. | 707/5 |
| 6,339,427 | B1* | 1/2002 | Laksono et al. | 345/553 |
| 6,405,111 | B2* | 6/2002 | Rogers et al. | 709/200 |
| 6,418,432 | B1* | 7/2002 | Cohen et al. | 707/5 |
| 6,430,552 | B1* | 8/2002 | Corston-Oliver | 707/3 |
| 6,490,579 | B1* | 12/2002 | Gao et al. | 707/4 |
| 6,574,655 | B1* | 6/2003 | Libert et al. | 707/10 |
| 6,578,046 | B2* | 6/2003 | Chang et al. | 707/100 |
| 6,601,061 | B1* | 7/2003 | Holt et al. | 707/3 |
| 6,601,062 | B1* | 7/2003 | Deshpande et al. | 707/3 |
| 6,675,159 | B1* | 1/2004 | Lin et al. | 707/3 |
| 6,721,736 | B1* | 4/2004 | Krug et al. | 707/3 |
| 6,732,088 | B1* | 5/2004 | Glance | 707/3 |
| 6,745,178 | B1* | 6/2004 | Emens et al. | 707/3 |
| 6,766,320 | B1* | 7/2004 | Wang et al. | 707/5 |
| 6,772,194 | B1* | 8/2004 | Goldschmidt | 709/203 |
| 6,792,576 | B1* | 9/2004 | Chidlovskii | 715/517 |
| 6,829,603 | B1* | 12/2004 | Chai et al. | 707/5 |
| 6,868,525 | B1* | 3/2005 | Szabo | 707/3 |
| 6,882,995 | B2* | 4/2005 | Nasr et al. | 707/3 |
| 6,892,196 | B1* | 5/2005 | Hughes | 707/4 |
| 6,999,959 | B1* | 2/2006 | Lawrence et al. | 707/3 |
| 7,003,781 | B1* | 2/2006 | Blackwell et al. | 719/327 |
| 7,058,626 | B1* | 6/2006 | Pan et al. | 707/4 |
| 7,082,428 | B1* | 7/2006 | Denny et al. | 707/E17.108 |
| 7,165,091 | B2* | 1/2007 | Lunenfeld | 707/E17.108 |
| 7,181,444 | B2* | 2/2007 | Porter et al. | 707/3 |
| 2001/0044794 | A1* | 11/2001 | Nasr et al. | 707/4 |
| 2002/0026443 | A1* | 2/2002 | Chang et al. | 707/10 |
| 2002/0049749 | A1* | 4/2002 | Helgeson et al. | 707/3 |
| 2002/0049756 | A1* | 4/2002 | Chua et al. | 707/4 |
| 2002/0054167 | A1* | 5/2002 | Hugh | 345/854 |
| 2002/0087667 | A1* | 7/2002 | Andersen | 709/220 |
| 2002/0154162 | A1* | 10/2002 | Bhatia et al. | 345/745 |
| 2002/0174122 | A1* | 11/2002 | Chou et al. | 707/100 |
| 2002/0194267 | A1* | 12/2002 | Flesner et al. | 709/203 |
| 2002/0198874 | A1* | 12/2002 | Nasr et al. | 707/3 |
| 2004/0128282 | A1* | 7/2004 | Kleinberger et al. | 707/3 |
| 2004/0167890 | A1* | 8/2004 | Eyal | 707/3 |
| 2004/0243568 | A1* | 12/2004 | Wang et al. | 707/3 |
| 2005/0165764 | A1* | 7/2005 | Liongosari | 707/3 |
| 2005/0165766 | A1* | 7/2005 | Szabo | 707/3 |
| 2005/0192970 | A1* | 9/2005 | Chou et al. | 707/10 |
| 2006/0007875 | A1* | 1/2006 | Andersen | 370/314 |
| 2006/0085798 | A1* | 4/2006 | Bendiksen et al. | 719/318 |
| 2007/0185717 | A1* | 8/2007 | Bennett | 704/270.1 |

FOREIGN PATENT DOCUMENTS

EP          1 072 984 A2 * 10/2000

OTHER PUBLICATIONS

Hammer et al. "Template-Based Wrappers in the TSIMMIS system"—1997 ACM (pp. 532-535).*

"Architecture of a Metasearch Engine that Supports User Information Needs"—Eric J. Glover, Steve Lawrence, William P. Birminggham, C. Lee Giles—ACM Nov. 1999 (pp. 210-216).*

"Predicate rewriting for translating Boolean queries in a heterogeneous information system"—Chen-Chuan K. Chang, Hector Garcia-Molina and Andreas Paepcke—ACM Transactions on Information Systems (TOIS), vol. 17, Issue 1 (Jan. 1999) ACM 1999 (pp. 1-39).*

"A query based approach for integrating heterogeneous data sources"—Ruxandra Domenig and Klaus R. Dittrich—CIKM 2000 ACM 2000 (pp. 453-460).*

"SqURL Searches Multiple Search Engines;" *Online Magazine 20*:2 (Mar. 1996), p. 77.

Haskin, D., "The Smart Web Searcher—EchoSearch Reaches Across Multiple Search Engines to Find What You're Look For;" *PC Magazine 15*:18 (Oct. 1996), p. 69.

Wang Baldonado, M., "Searching, Browsing, and Metasearching with Sense Maker;" *Web Techniques 2*:5 (May 1997), pp. 42-47.

Klingler, S., "Search the Internet the Easy Way—WebCompass Both Organizes and Prioritizes Results from Multiple Search Engines;" *LAN Times 14*:10 (May 1997), p. 56.

Dreilinger, D. et al., "Experiences with Selecting Search Engines Using Metasearch;" *ACM Transactions on Information Systems 15*:3 (Jul. 1997), pp. 195-222.

Hibbard, J., "WebSleuth Queries Multiple Engines and Linguistically Analyzes the Results;" *Information Week*, Jul. 7, 1997, p. 65.

"JWSG Offers $5 Easy To Use Personal Search Assistant: WebShades; The Fast and Lightweight Mini-window Search Tool, Scans Multiple Search Engines With Optional In-page html Searching;" *Newswire*, Aug. 6, 1997.

"American Systems Has Released Internet EZ Search v. 2.0, Which Queries 49 Major Web Search Engines At Once;" *Information Week*, Oct. 20, 1997, p. 174.

Edwards, M., "Magnifi's Search Engine Handles Multiple File Types;" *InfoWorld 20*:7, Feb. 16, 1998, p. 94.

Benitez, A. et al., "Using Relevance Feedback in Content-Based Image Metasearch;" *IEEE Internet Computing 2*:4 (Jul.-Aug. 1998), pp. 59-69.

Fan, Y. et al., "Adaptive Agents for Information Gathering from Multiple, Distributed Information Sources;" *Tech Rep—American Association of Artificial Intelligence SS 99*:03 (Mar. 1999), pp. 40-46.

Hannappel, P. et al., "MSEEC—A Multi Search Engine With Multiple Clustering;" *Managing IT Resources in Organizations* (May 1999), pp. 304-312.

Glover, E. et al., "Architecture of a Metasearch Engine that Supports User Information Needs;" *CIKM 8th International Conference* (Nov. 1999), pp. 210-216.

Shu, B. et al., "A Neural Network-Based Intelligent Metasearch Engine;" *Information Sciences 120* (Nov. 1999), pp. 1-11.

Taehee, K. et al., "Integration of Multiple Heterogeneous Databases Using a Client-Side Meta Search Agent;" *IAT 1st Asia-Pacific Conference* (Dec. 1999), pp. 234-243.

Aslam, J. et al., "Bayes Optimal Metasearch: A Probabilistic Model for Combining the Results of Multiple Retrieval Systems;" *SIGIR Forum 34* (2000), pp. 379-381.

Wang, W. et al., "Concept Hierarchy Based Text Database Categorization in a Metasearch Engine Environment;" *IEEE Proceedings of the International Conference on Web Information Systems Engineering* (Jun. 2000), pp. 283-290.

Mishra, R. et al., "KhojYantra: An Integrated MetaSearch Engine withClassification, Clustering and Ranking;"*IEEE International Database Engineering and Application Symposium* (Sep. 2000), pp. 122-133.

Yu, C. et al., "Efficient and Effective Metasearch for Text Databases Incorporating Linkages among Documents;" *SIGMOD Record 30*:2 (Jun. 2001), pp. 187-198.

* cited by examiner

SYSTEM AND METHOD FOR SEARCHING MULTIPLE DISPARATE SEARCH ENGINES

RELATED APPLICATION

This utility application is related to a previously filed U.S. Provisional Application, Application No. 60/237,804, filed on Oct. 11, 2000, the benefit of the earlier filing date of which is hereby claimed under 35 U.S.C. § 119 (e).

FIELD OF THE INVENTION

The present invention relates to database searching and search engines. More specifically, the invention relates to searching multiple disparate search engines.

BACKGROUND OF THE INVENTION

Electronic information searching and search capabilities are an important and evolving part of computing technology. Search engines are a general class of applications that search a database for specified query parameters and return a list of documents associated with those query parameters. Search engines may also be associated with a single application. For example, computer programs often have an associated help module that allows a user to search for a help topic on that particular computer program.

One limitation common to search engines is that they are only able to search a single source. Search engines associated with a computer program may search a database associated with the help module, generally without searching any other source. To search other sources, a user has to launch another search engine to perform the search. For instance, a help module may allow a user to search a help database about an associated application with one query, but another search engine may be required to search the WWW for similar information. The user cannot search both sources at the same time from the same search engine.

Meta searchers, most commonly associated with the WWW, are not actually search engines, but rather provide a common front end for multiple search engines. Meta searchers interact directly with a native interface to each of the multiple search engines, making it impossible for other search engines to easily make their information available to the meta searcher. This limitation creates a barrier to adding additional search engines to the meta searcher.

These and other problems render existing search systems inadequate to easily make available the information stored by many search engines to a common search client.

SUMMARY OF THE INVENTION

The present invention overcomes the problems identified above by providing a common interface with which one or more search engines may be queried through a common search client, and which allows various search engines to easily register with the common search client. Briefly stated, the search system provides a uniform wrapper that exposes a common interface to a search manager, and which interacts with a search engine through the search engine's native interface. Through the use of many such uniform wrappers, an arbitrary number of search engines may "plug in" or be added to the system at any time, thereby extending the search capabilities of the search system with each new addition.

In one aspect, the present invention provides a search system for performing electronic data searches using a standardized set of interfaces. Preferably, standard COM interfaces are provided between a search manager and multiple search engines. Each search engine is "wrapped" by a COM object that exports a search engine application program interface (API). The wrapper provides communication between the search engine manager and its associated search engine. The search engine may be on a local machine, a network, the Internet, or the like. Each search engine registers with the search system. A list of registered search engines is kept in a store of search engines, such as a local XML file. With this construct, a search query may be provided to the search manager by a search client and passed to each of the several search engines via the standard wrapper APIs. Results from each search engine may be returned, via the standard APIs, to the search client.

In one example, when a client executes a query, the search engine manager calls each wrapper registered to handle queries for participating search engines. The wrappers may be called to execute their respective searches asynchronously in parallel. Optionally, the client may enable or disable particular registered search engines. The search results of each search engine may be returned as the searches are completed. Status updates may be provided to the search engine manager as the searches are performed, such as which searches are complete and which are still being processed. If a particular search engine allows for refined search capabilities, those may also be made available to the client.

Advantageously, the search system is extensible, allowing for a more unified system for performing search queries. In other words, there are no limitations to the number of search engines available to a client. The only practical limitation of the search system is the number of registered search engines.

DETAILED DESCRIPTION OF EMBODIMENTS OF THE INVENTION

One embodiment of the present invention takes the form of a computer-implemented system or method for performing search queries on multiple disparate search engines with each search engine having its own native interface. Each search engine includes a wrapper that exports a common set of interfaces to a search manager. The wrappers for the several search engines are dynamically loadable into the search system. The search manager may receive a search query and present it to each of the several wrappers using the common interfaces. Each wrapper then transforms the queries into the native format of the respective wrapper, and passes the transformed query to the associated search engine. The wrappers may also present the results of the query to the search manager using the same common interfaces. This particular embodiment, together with certain alternatives, is described in detail below with reference to the included Figures.

Illustrative Operating Environment

Figure 1:
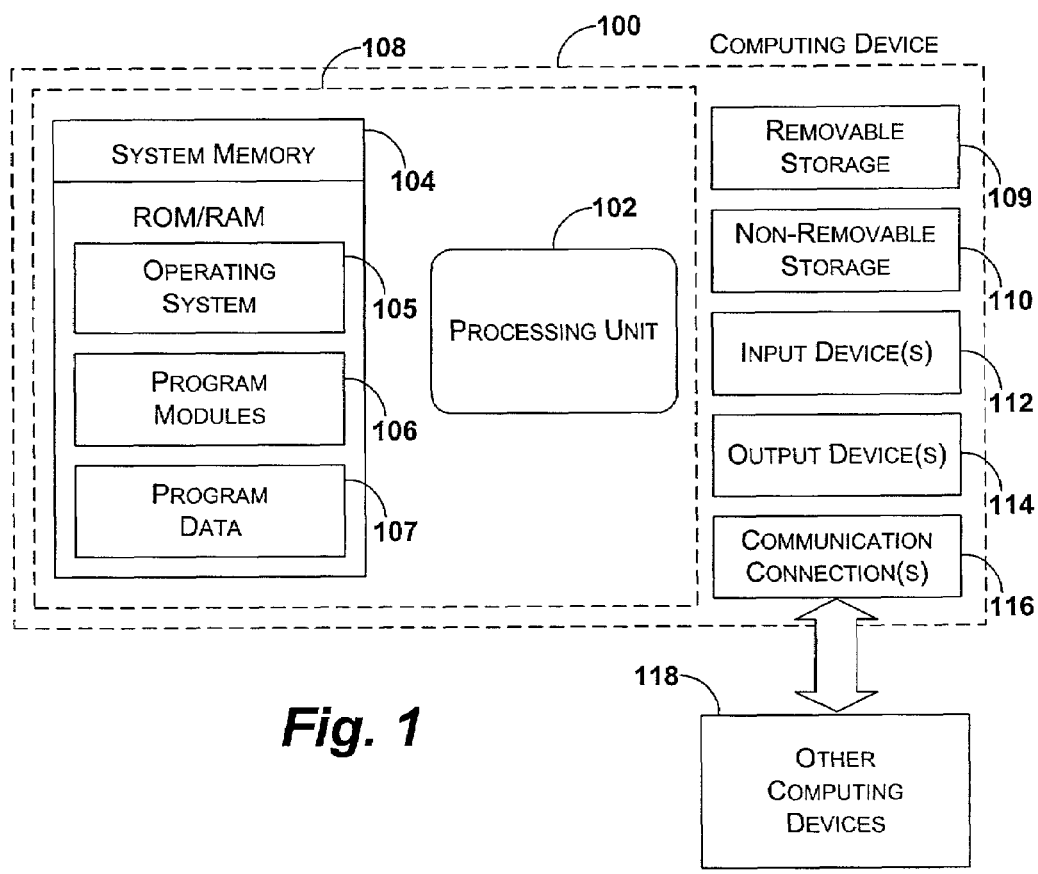
FIG. 1 is a block diagram representing a computer system into which the present invention may be incorporated.

With reference to FIG. 1, an exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communications connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Search System

Figure 2:
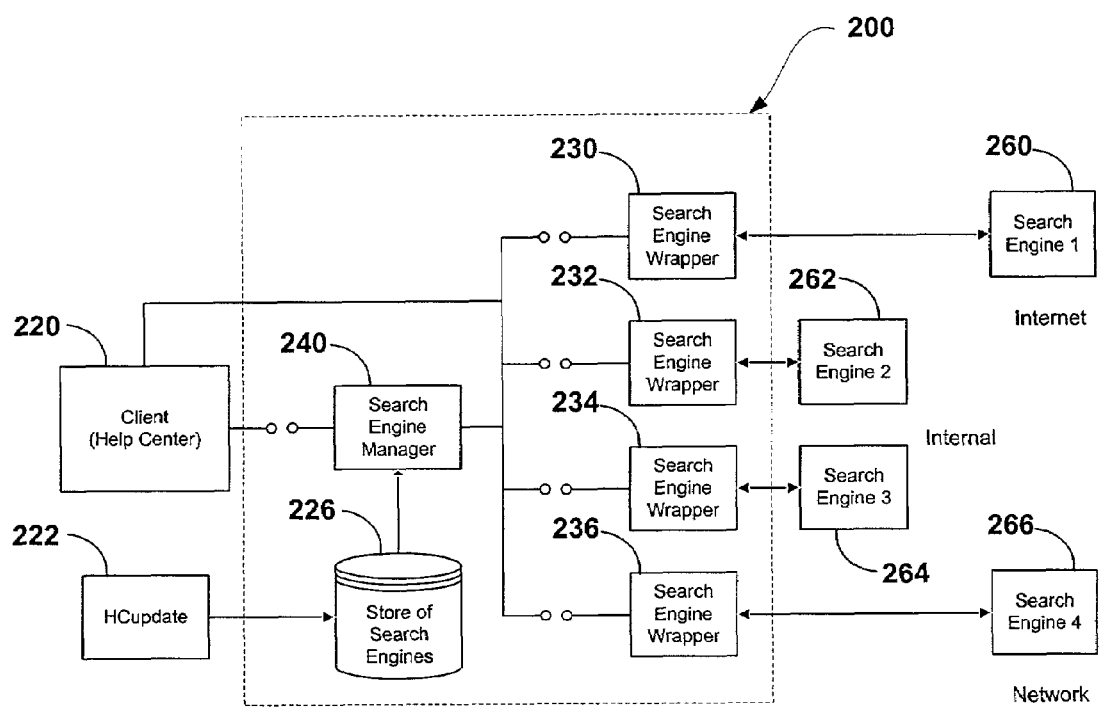
FIG. 2 is a functional block diagram generally illustrating a search system constructed in accordance with one implementation of the present invention.

FIG. 2 is a functional block diagram that, together with the following discussion, provide a brief, general description of an illustrative search system for searching multiple disparate search engines. Briefly stated, the search system 200 allows a client 220 to execute a query on multiple disparate search engines. The multiple disparate search engines are represented by search engines 260-266 shown in FIG. 2. It will be appreciated that the standard interfaces provided by this embodiment of the invention enable any number of search engines to be integrated into the system 200. Also, search engines 260-266 are not limited to a particular type of search engine. Search engines 260-266 may be any form of search engine resident at any location, such as an internal search engine 262 or 264, a network search engine 266, an Internet search engine 260, or other type of search engines.

The search system 200 is also operable with any type of client 220 that can be used to formulate and present a search query to the search manager 240. The client 220 may be configured to provide a user interface, or may be configured to provide search capabilities to an application program, or the like. In this example, the illustrative client 220 is a Help Center module provided with the Windows 2000 operating system owned and licensed by the Microsoft Corporation of Redmond, Wash. The Help Center module provides search capabilities for topics relating to features of the operating system or other installed application programs. It will be appreciated, however, that the client 220 can be any application or software module configured to interface with the search engine manager 240 and provide search query functionality. The client 220 may be further configured to provide query modifiers, such as for selecting which of the available registered search engines to perform the query. The client 220 may additionally and optionally provide other query limitations.

The search system 200 also includes a search engine manager 240, a search engine store 226, and search engine wrappers 230-236. Briefly stated, the search engine manager 240 is configured to receive a query initiated by the client 220 as well as any additional information provided with the query. The additional information provided may include parameters, variable, or limitations to the query provided by the client. One such parameter may include the maximum number of results to be returned. Search engine manager 240 is configured to build a query from the information received from the client 220 and pass the standard query to one or more search engine wrappers 230-236. The components of the search engine manager 240 are discussed in greater detail below.

The search engine store 226 is configured to store information to identify to the system 200 the search engine wrappers 230-236 and search engines 260-266. The information in the search engine store 226 is used by the search engine manager 240 to identify search engines, such as search engines 260-266, that have registered themselves for service with the system 200. The information stored may include a wrapper identifier or wrapper ID for each search engine wrapper 230-236 and possibly additional capabilities or limitations of each search engine 260-266. The wrapper ID can be used to allow a client 220 to select or deselect search engines 260-266. In one embodiment, the search engine store 226 may be an eXtensible Markup Language (XML) type file maintained by an HCUpdate service 222 to store information about search engines that register with the system 200.

Search engine wrappers 230-236 are configured to receive the standard query from the search engine manager 240 via a set of common interfaces between each search engine wrapper and the search engine manager 240. Each search engine wrapper is additionally configured to translate the received query into the native format of its respective search engine. The components of each search engine wrapper 230-236 are discussed in greater detail below.

Figure 3:
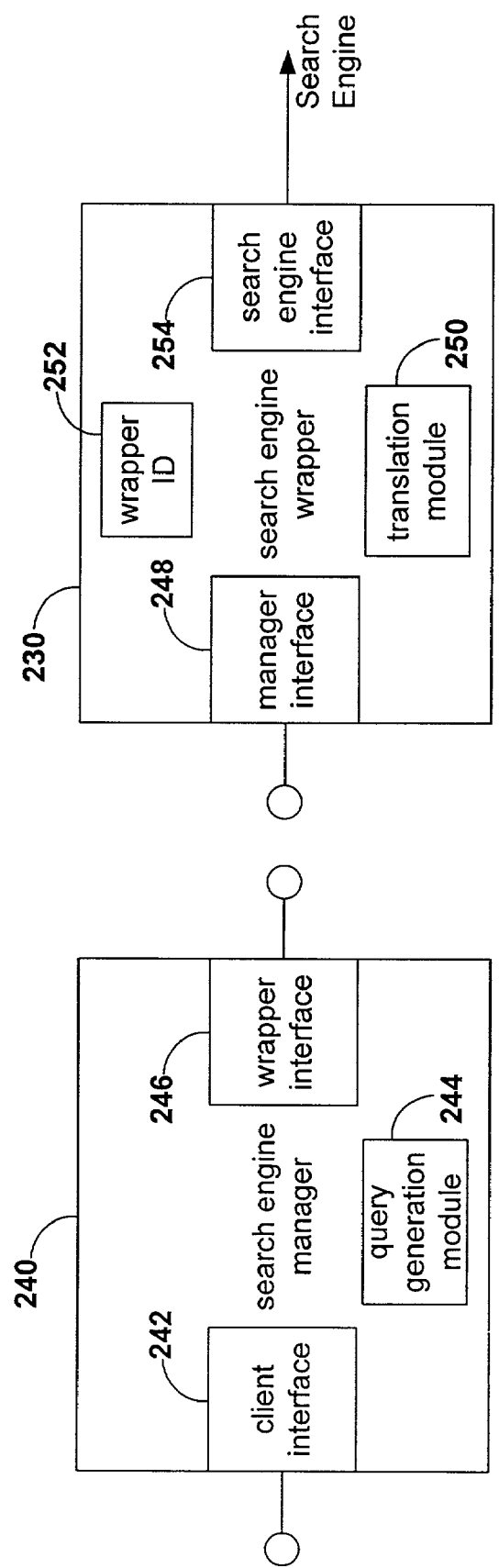
FIG. 3 is a functional block diagram illustrating the components and interfaces of the search engine manager and search engine wrapper.

FIG. 3 is a functional block diagram illustrating components and interfaces of the search engine manager 240 and one example search engine wrapper 230 constructed in accordance with this embodiment of the invention. The search engine manager 240 and the search engine wrapper 230 may be constructed in accordance with the well known Component Object Model (COM) specification for software modules.

First, Search engine manager 240 includes a client interface 242, a query generation module 244, and a wrapper interface 246. The client interface 242 of search engine manager 240 provides Application Programming Interfaces (APIs) that allow the client 220 to communicate with the search engine manager 240. It is through client interface 242 that search engine manager 240 receives query information from the client 220, as well as passing progress updates back to the client 220 when called.

Query generation module 244 is configured to receive the query from the client interface 242, along with any additional information or limitations regarding the query, and build a standard query in a format understood by the search engine wrappers 230-236. The standard query is in a common format and includes sufficient information from the client's query to retrieve information related to the client's query from each of the registered search engines.

Wrapper interface 246 provides the APIs that allow the search engine manager 240 to communicate with each search engine wrapper, such as search engine wrapper 230. Wrapper interface 246 is configured to issue the standard query in a common format to each search engine wrapper that is registered to provide search capabilities.

Next, the search engine wrapper 230 includes a manager interface 248, a translation module 250, a wrapper ID 252, and a search engine interface 254. Search engine wrapper 230 is representative of the other search engine wrappers 232-236 that may be registered with the system 200, but that each search engine wrapper may be different to accommodate the native communication mechanism of the search engine wrapper's respective search engine.

Manager interface 248 provides the APIs for the search engine wrapper 230 to communicate with the search engine manager 240. Through manager interface 248, search engine wrapper 230 receives the standard query and passes back progress updates of the query's execution by search engines 260-266.

Translation module 250 is configured to translate the standard query received at the manager interface 248 to the native format of the search engine supported by the wrapper 230, search engine 260 in this case. Each search engine wrapper includes a translation module 250 that translates the standard query into a query in the native format of the search engines 260-266 associated with that search engine wrapper 230-236. In this way, the query originally generated by the client may be presented to each search engine in the native format of the search engine without undue modification to the search engine to receive many various forms of search query.

Wrapper ID 252 is an identifier for the search engine wrapper 230. Wrapper ID 252 may be presented to a service charged with maintaining the search engine store 226 as an identifier for the wrapper during the registration process. The wrapper ID 252 may be stored in the search engine store 226 to allow the search engine manager 240 to enumerate each search engine wrapper 230-236 from the search engine store 226.

Search engine interface 254 provides the APIs for search engine wrapper 230 to communicate with search engine 260. Each search engine wrapper registered with the system 200 transforms the standard query created by the search engine manager 240 into a native format understandable by the search engine associated with the wrapper. For that reason, the search engine interface 254 for each wrapper is likely to include code or modules that result in a different transformation of the standard query. Thus, a difference between search engine wrappers 230-236 may be discovered when examined at their associated search engine interface 254.

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred variously as operations, structural devices, acts, modules, or the like. It will be recognized by one skilled in the art that these operations, structural devices, acts, modules, or the like may be implemented in software, in firmware, in special purpose logic, analog circuitry, or any combination thereof without deviating from the spirit and scope of the present invention as recited within the claims attached hereto.

Figure 4:
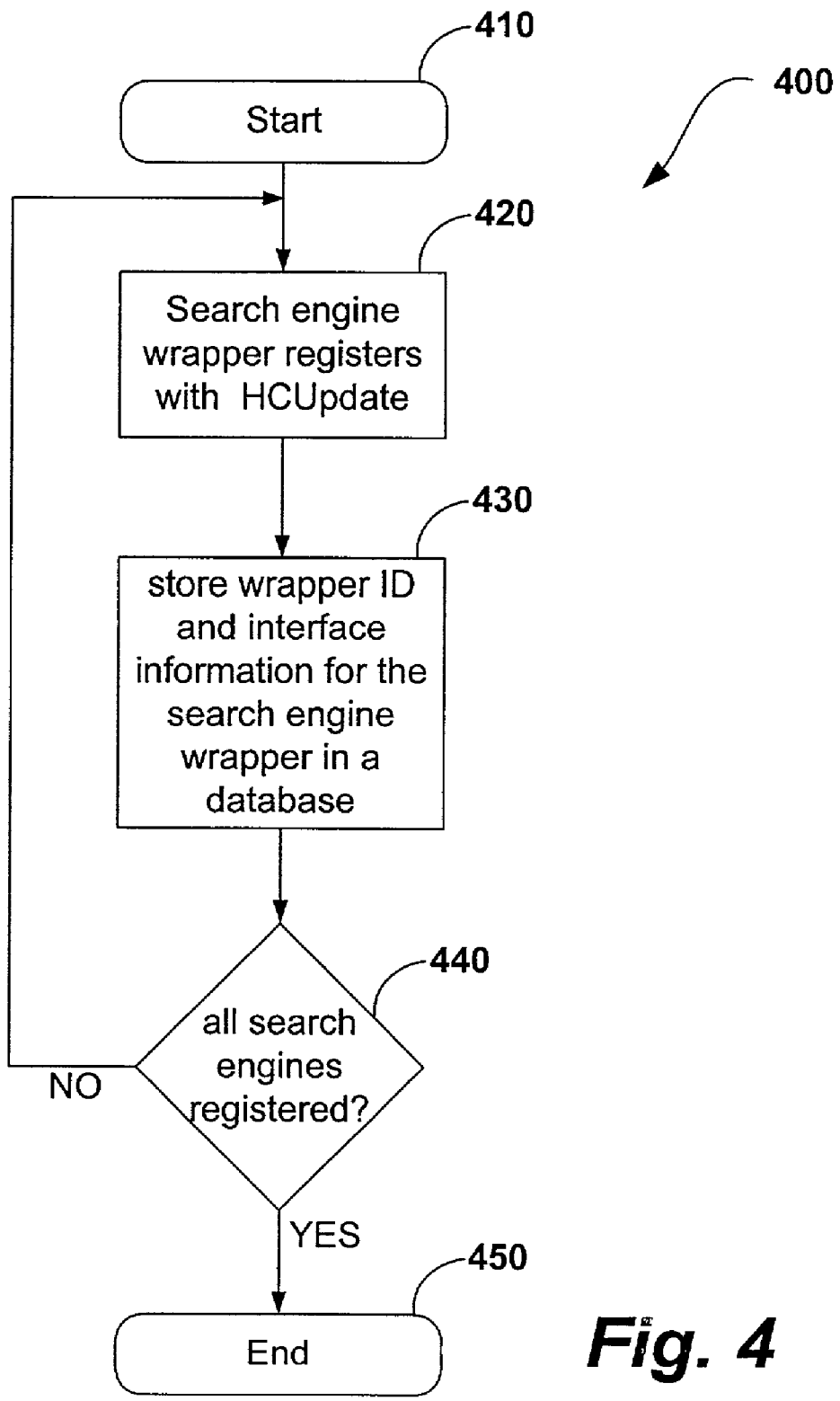
FIG. 4 is a logical flow diagram that generally describes a process by which search engine wrappers can register with the search system.

FIG. 4 is a logical flow diagram that generally describes a process by which search engine wrapper 230 registers with the search system 200. The process 400 begins at starting block 410, where the search system 200 is in operation and any search engine wrappers that desire to provide their searching services have been constructed, ready to be registered with the search system 200. The process 400 continues at block 420.

At block 420, search wrapper 230 calls a service charged with maintaining a data store, such as the search engine store 226, to register as a provider of searching capability. For instance, the search wrapper 230 may call an HCUpdate service 222 to register itself as providing search capabilities to the search system 200. Search engine wrapper 230 may provide a wrapper ID 252, its interface information, and may possibly include additional information describing its associated search engine 260. Search engine wrapper 230 may also provide limitations or additional parameters required by search engine 260 to complete a search query. Once search engine wrapper 230 has presented its registration information to the search engine store 226, the process continues to block 430.

At block 430, wrapper ID 252 and the interface information for search engine 260 is stored in a database. The database may be of any type. For example, an XML file may be used to store the wrapper and search engine interface information. The database (such as the search engine store 226 shown in FIG. 2) is available to search engine manager 240, allowing search engine manager 240 to access the database when a query is initiated by the client 220. By registering, search engine wrapper 230 has made the search capabilities of search engine 260 available to the search system 200. When the wrapper ID 250 and other search engine information of search engine wrapper 230 has been stored, the process proceeds to decision block 440.

At decision block 440, the search system 200 determines whether there remain search engine wrappers to register their search services. If so, blocks 420 and 430 are repeated until the search engines 260-266 currently requesting to be registered are registered. Although only four search engines 260-266 are depicted in FIG. 2, any number of search engines may be registered with the search system 200. Also, blocks 420 and 430 may be repeated at any time to register search engines with the search system 200. For the search system 200 depicted in FIG. 2, blocks 420 and 430 are repeated until each search engine 260-266 has been registered with the search system 200. Once all requesting search engines have been registered with the search system 200, the process proceeds to block 450 where the process ends.

Figure 5:
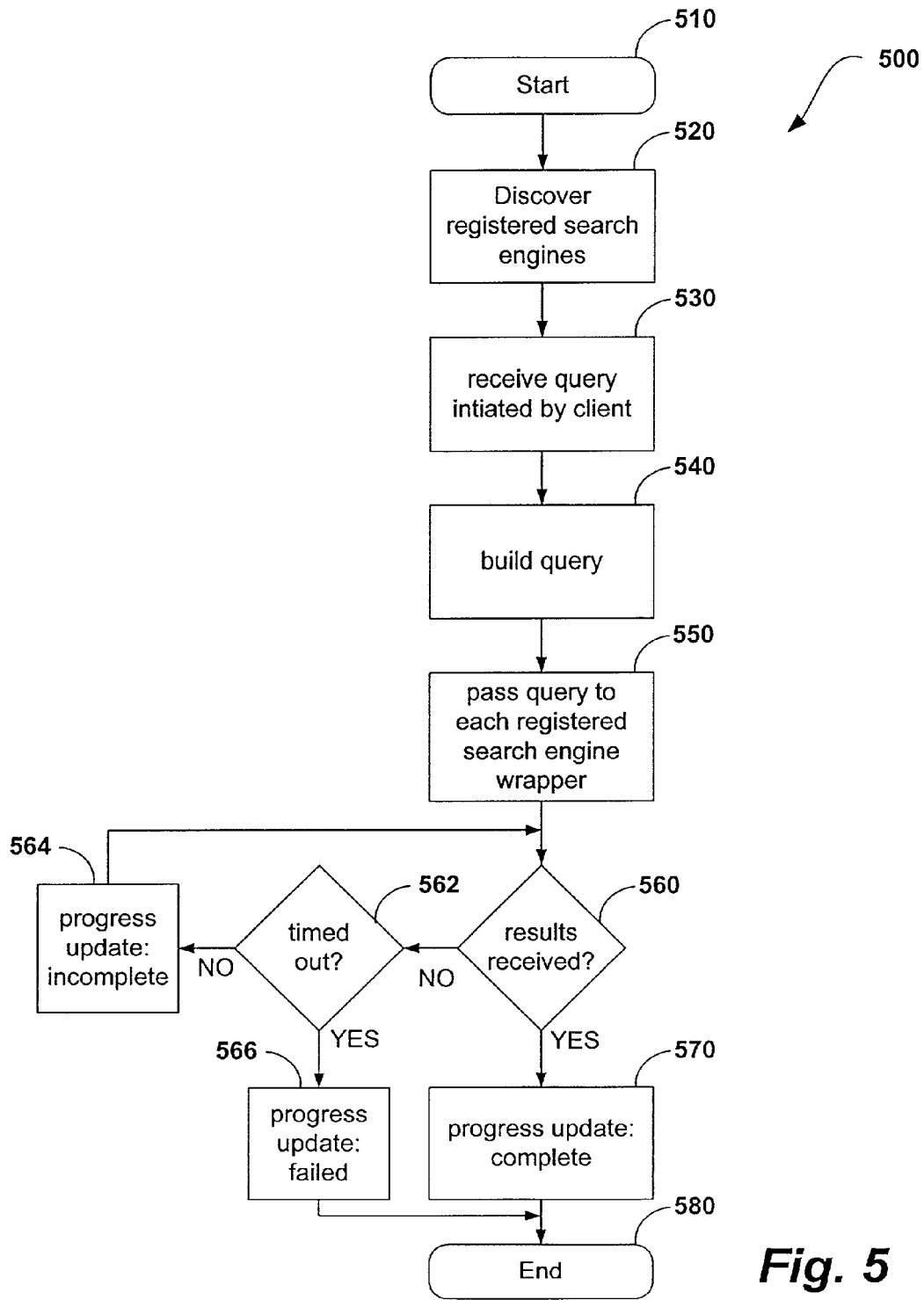
FIG. 5 is a logical flow diagram which generally illustrates a process performed by the search engine manager for passing a client entered query to the search engine wrappers.

FIG. 5 is a logical flow diagram that generally illustrates a process performed by search engine manager 240 for passing a client query to search engine wrappers 230-236. The process 500 begins at block 510, where search engines 260-266 have been registered with the search system 200 through their search engine wrappers 230-236. Alternatively, the search system 200 may provide an associated search engine, packaged with system 200, that bypasses the registration requirement and that enables the search system 200 to operate immediately. The process 500 continues at block 520.

At block 520, search engine manager 240 discovers which search engines 260-266 are registered with the search system 200. In this embodiment, search engine manager 240 accesses the search engine store 226 to retrieve identification information for each registered search engine wrapper, such as a wrapper ID 252 corresponding to each search engine wrapper. Search engine manager 240 may also retrieve other information from the search engine store 226, such as any parameter limitations or query modifiers that are possibly associated with a particular search engine. Once the registered search engines 260-266 have been discovered, the process 500 proceeds to block 530.

At block 530, search engine manager 240 receives a query initiated by the client 220. The client 220 passes the query to search engine manager 240 via client interface 242. In this embodiment, the client interface 242 is a standardized COM interface allowing for ease of communication between the client 220 and search engine manager 240. The query may additionally identify any particular search engines to exclude from the search if that information has been made available to the client via the client interface 242. Once search engine manager 240 receives the client query, the process 500 proceeds to block 540.

At block 540, search engine manager 240 builds a standard query to be passed to the several search engine wrappers 230-236. The client query is in a format that meets the requirement of the API between the client 220 and search engine manager 240. The search engine manager 240 then generates a standard query from the client query. The query generation module 244, shown in FIG. 3, performs the task of building the standard query in the standard format that will be understood by the several search engine wrappers 230-236. Once the standard query is built, the process proceeds to block 550.

At block 550, search engine manager 240 passes the standard query to each registered search engine wrapper 230-236. The standard query is passed via wrapper interface 246, shown in FIG. 3. In this embodiment, the standard query is transmitted to each search engine wrapper 230-236 in series until each search engine wrapper 230-236 has received the standard query. Optionally, if any search engines were identified for exclusion in the client query, the search engine manager 240 does not transmit the standard query to the excluded search engine wrappers. In one embodiment, the standard query is the same for each search engine wrapper 230-236. In another embodiment, the search engine manager 240 may change the standard query in accordance with any specific information about a particular search engine identified when the several registered search engine wrappers were registered. Once the standard query has been sent to the search engine wrappers 230-236, the process continues at decision block 560.

At decision block 560, search engine manager 240 idles awaiting results from one of the search engine wrappers, for example search engine wrapper 230. While idling, search engine wrapper 230 may notify the search engine manager 240 of the progress of the standard query, described below. In one embodiment, the results of each search engine wrapper 230-236 return as they are completed rather than in a particular order. Depending on whether search engine wrapper 230 is finished with the standard query, the process 500 proceeds to decision block 562 or block 570 for search engine wrapper 230.

At decision block 562, when the results have not been received for search engine wrapper 230, the elapsed time since the standard query was passed to search engine wrapper 230 is compared to a specified allowable time. If the elapsed time is greater than the specified allowable time, the standard query transmitted to search engine wrapper is "timed out." If the standard query transmitted to search engine wrapper 230 has timed out, the process continues to block 566. If the standard query transmitted to search engine wrapper 230 has not timed out, the process 500 continues to block 564.

At block 564, if the standard query for search engine wrapper 230 is not complete and is not timed out, a progress update, along with the wrapper ID 252, is transmitted back to search engine manager 240 signifying that the standard query is incomplete. After the progress update and wrapper ID 252 are transmitted back to search engine manager 240, the process 500 returns to decision block 560, and if necessary decision block 562 and block 564, until the standard query transmitted to search engine wrapper 230 is complete or timed out.

At block 566, if the standard query for search engine wrapper 230 is not complete and has timed out, a failure notification is returned to the search engine manager 240. In one embodiment, the wrapper ID 252 identifying search engine wrapper 230 is returned with the failure notification to the search engine manager 240. Once the failure notification is transmitted to the search engine manager 240, the process 500 proceeds to block 580 where the process 500 for search engine wrapper 230 ends.

At block 570, if the standard query transmitted to search engine wrapper 230 is complete, a progress update is returned to the search engine manager 240 signifying that the standard query is complete. In one embodiment, the wrapper ID 252 identifying search engine wrapper 230 is returned with the notification that the standard query is complete. Alternatively, a success or error code may be returned to search engine manager 240 by the particular search engine wrapper 230-236. The operations of blocks 560, 562, 564, 566, and 570 are repeated for each registered search engine wrapper 230-236 that is enabled. As the standard queries are performed asynchronously, search engine wrappers 230-236 may complete the operations at different times. Once the search engine manager 240 has received a notification from every enabled search engine wrapper 230-236 that they are complete with their standard queries (or a timeout occurs), the process 500 continues to block 580, where the process 500 ends.

Figure 6:
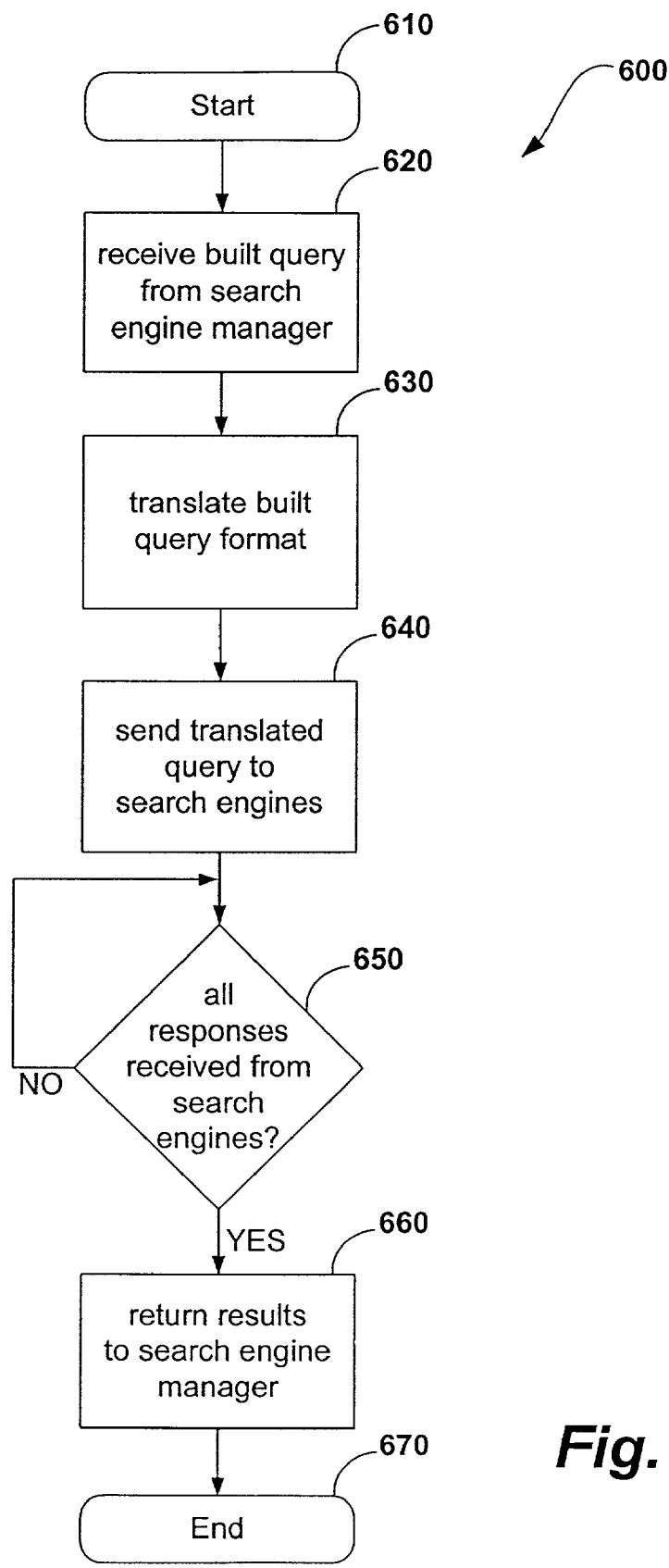
FIG. 6 is a logical flow diagram that generally illustrates a process performed by the search engine wrappers for executing a query to the multiple disparate search engines.

FIG. 6 is a logical flow diagram that generally illustrates a process performed by search engine wrapper 230 for executing a query by its associated search engine 260. The process 600 may be performed by each registered search engine wrapper 230-236 that receives the standard query in accordance with the process illustrated in FIG. 5 and described above. The process 600, begins at start block 610 where search engine wrappers 230-236 have registered with the search system 200 and are ready to execute a query. Once a query has been executed by a client 220, the query has been received by search engine manager 240, and the standard query has been built by the query generation module 244, the process 600 proceeds to block 620.

At block 620, search engine wrapper 230 receives the standard query from search engine manager 240. The standard query is transmitted to search engine wrapper 230 via manager interface 248. The standard query may be the standard query transmitted to the rest of the search engine wrappers 232-236, or it may have been modified as previously stated. Once search engine wrapper 230 receives the standard query, the process 600 proceeds to block 630.

At block 630, the standard query received from search engine manager 240 is translated from the standard format, as understood by the COM interface between search engine manager 240 and search engine wrapper 230, to the native format understood by search engine 260. The translation is performed by the translation module 250 of search engine wrapper 230 and is likely to be different for each search engine wrapper. Each of the several translation modules of the several search engine wrappers 230-236, such as translation module 250, translates the standard query into the native format of its respective search engine 260-266. Once the standard query of search engine manager 240 has been translated by the translation module 250 of the search engine wrapper 230, the process 600 continues at block 640.

At block 640, the translated query, translated by the translation module 250 of the search engine wrapper 230, is transmitted from search engine wrapper 230 to search engine 260 to be executed. The translated query is transmitted via search engine interface 254. As mentioned above, search engine interface 254 is the native interface format by which search engine 260 was originally configured to receive queries. As the translated query is now in this native format, the translated query may be executed by the search engine 260. Optionally, the query parameters or values may be modified dynamically according to any additional or unique search capabilities search engine 260 may provide. Once search engine wrapper 230 has sent the translated query, translated by the translation module 250 of the search engine wrapper 230, to search engine 260, the process continues at decision block 650.

At decision block 650, search engine wrapper 230 idles awaiting a response from each of the search engine wrappers that their respective queries have been completed or have timed out. While idling for these responses, search engine wrapper 230 may periodically send progress updates, as mentioned previously in relation to FIG. 5, to search engine manager 240. The search engine wrapper 230 continues to idle until the search engine 260 completes the query or is timed out. Once search engine wrapper 230 receives the responses that the query is complete or has timed out from the search engine wrapper 230, the process 600 continues to block 660.

At block 660, search engine wrapper 230 returns the results obtained from the search engines 260-266 to the search engine manager 240. In one embodiment, the results are returned in response to a request for the results from the search engine manager 240. In another embodiment, the results are returned at the end of a specified time period. The results may then be returned to the client 220 together with or separate from the results from the other search engine wrappers 232-236. Once search engine wrapper 230 returns the results to client 220, the process 600 proceeds to block 670 where the process ends.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for communicating between a client and a plurality of search engines in a distributed processing system, comprising the steps of:
    providing a search engine manager having a client interface configured to allow the search engine manager to communicate with the client, a query generation module configured to receive a search query from the client interface and to generate a standard query, and a wrapper interface configured to provide the standard query to a search engine wrapper;
    providing the search engine wrapper having a manager interface configured to provide standardized communication between the search engine manager and the search engine wrapper, a query translation module configured to translate the standard query received from the search engine manager into a native format query associated with a registered search engine, and a search engine interface configured to allow the search engine wrapper to communicate with the registered search engine in the native format of the registered search engine, wherein the search engine wrapper includes a wrapper ID, wherein the search engine wrapper presents the wrapper ID to a search engine store to identify the search engine wrapper during a registration process;
    discovering the search engine registered with a search system by accessing the search engine store and identifying the search engine wrapper ID associated with the registered search engine;
    receiving the search query at the search engine manager, having a plurality of search parameters, the search query being generated by a search client;
    building the standard query from the search query, wherein the standard query is universally configured to be understandable by a plurality of search engine wrappers;
    issuing the standard query to each of the plurality of search engine wrappers;
    receiving the standard query at each of the plurality of search engine wrappers;
    at each of the plurality of search engine wrappers, translating the standard query to the native format query for the search engine associated with the search engine wrapper, wherein the native format query is unique to the search engine associated with the search engine wrapper; and
    issuing, from each of the search engine wrappers, the unique native format query to the search engine associate with the search engine wrapper.

2. The method of claim 1, wherein each search engine wrapper is configured to issue a progress update and the wrapper ID to the search engine manager.

3. The method of claim 1, wherein the search engine manager is configured to disable issuing the standard query to a selected search engine wrapper in accordance with the search query.

4. The method of claim 1, wherein issuing the standard query to the search engine wrappers is facilitated by a standardized interface.

5. The method of claim 4, wherein the standardized interface includes a COM (component object model) interface.

6. The method of claim 5, wherein the search engine wrapper is registered with the search engine manager to provide searching capabilities.

7. A computer-readable storage medium having computer-executable instructions for performing steps, comprising:
- providing a search engine manager having a client interface configured to allow the search engine manager to communicate with a client, a query generation module configured to receive a search query from the client interface and to generate a standard query, and a wrapper interface configured to provide the standard query to a search engine wrapper;
- providing a plurality of search engine wrappers having a manager interface configured to provide standardized communication between the search engine manager and the search engine wrappers, a query translation module configured to translate the standard query received from the search engine manager into a native format query associated with a registered search engine, and a search engine interface configured to allow the search engine wrappers to communicate with the registered search engine in the native format of the registered search engine, wherein the plurality of search engine wrappers include wrapper IDs, wherein the plurality of search engine wrappers present the wrapper IDs to a search engine store to identify each of the search engine wrappers during a registration process;
- registering a search engine with the search engine manager to provide searching capabilities, wherein registering includes storing a search engine wrapper ID associated with the registered search engine;
- receiving, at the search engine manager, the search query from the client;
- building the standard query from the search query received from the client, wherein the standard query is universally formatted for the search engine wrappers;
- passing the standard query from the search engine manager to the plurality of search engine wrappers, wherein each of the plurality of search engine wrappers is associated with a different registered search engine;
- translating, at each of the search engine wrappers, the standard query to a translated query in the native format of the registered search engine associated with the search engine wrapper, wherein each of the search engine wrappers translates the standard query into a different native format;
- transmitting the translated query to the registered search engine; and
- receiving results of the translated query from the registered search engine.

8. The computer-readable storage medium of claim 7, wherein registering the search engine further comprises registering an associated search engine wrapper with a common registration service.

9. The computer-readable storage medium of claim 8, wherein registering the associated search engine wrapper further comprises storing the wrapper ID which uniquely identifies the associated search engine wrapper, and storing other information, in a database associated with the common registration service.

10. The computer-readable storage medium of claim 9, wherein the standardized interface includes a COM (Component Object Model) interface.

11. The computer-readable storage medium of claim 7, wherein passing the standard query from the search engine manager is performed through a standardized interface allowing for a multiplicity of search engine wrappers associated with other search engines to receive the standard query.

12. The computer-readable storage medium of claim 7, wherein building the standard query further comprises combining, by the query generation module, the client query with other parameters received from the client.

13. The computer-readable storage medium of claim 7, wherein translating the standard query further comprises transforming the standard query to the native format of the search engine through the use of the translation module.

14. The computer-readable storage medium of claim 7, wherein receiving the results further comprises enumerating the results, returning the wrapper ID to the search engine manager, and returning progress updates to the manager until the results are returned.

15. A computer-readable storage medium having computer-executable instructions for performing steps, comprising:
- providing a search engine manager having a client interface configured to allow the search engine manager to communicate with the client, a query generation module configured to receive a search query from the client interface and to generate a standard query, and a wrapper interface configured to provide the standard query to a search engine wrapper;
- providing at least one search engine wrapper having a manager interface configured to provide standardized communication between the search engine manager and the search engine wrapper, a query translation module configured to translate the standard query received from the search engine manager into a native format query associated with a registered search engine, and a search engine interface configured to allow the search engine wrapper to communicate with the registered search engine in the native format of the registered search engine, wherein the at least one search engine wrapper includes a wrapper ID, wherein the search engine wrapper presents the wrapper ID to a search engine store to identify the wrapper during a registration process;
- discovering at least one search engine registered with a search system by accessing the search engine store and identifying at least one search engine wrapper ID associated with the at least one search engine;
- receiving a query initiated by the client accessing the search system;
- building the standard query from the query initiated by the client, wherein the standard query is universally configured to be understandable by a plurality of engine wrappers;
- transmitting the standard query to the plurality of search engine wrappers, wherein each search engine wrapper is configured to translate the search query into the native format that is unique to the search engine registered with the search engine wrapper;
- requesting a response from each of the search engine wrappers the response including a progress update for the standard query as it is executed and the results of the standard query; and
- receiving responses from each of the search engine wrappers.

16. The computer-readable storage medium of claim 15, wherein discovering the search engine registered with the search system further comprises accessing the search engine store to retrieve identification information for the at least one search engine registered with the search system.

17. The computer-readable storage medium of claim 15, wherein receiving the query initiated by the client further comprises receiving the query through a COM interface.

18. The computer-readable storage medium of claim 15, wherein building the standard query further comprises using a query generation module.

19. The computer-readable storage medium of claim 15, wherein transmitting the standard query further comprises not transmitting the standard query to a search engine wrapper that is excluded by the client.

20. The computer-readable storage medium of claim 15, wherein the response received indicates that the standard query is complete.

21. The computer-readable storage medium of claim 15, wherein the response received indicates that the standard query failed because a time limit for receiving a response is exceeded.

22. The computer-readable storage medium of claim 15, wherein the response indicates that the standard query is incomplete because the at least one search engine associated with the at least one search engine wrapper is not finished with its associated native format query.

23. A system, comprising:
a processor;
a memory having computer-executable instructions stored thereon, wherein the computer executable instructions are configured for:
providing a search engine manager having a client interface configured to allow the search engine manager to communicate with the client, a query generation module configured to receive a search query from the client interface and to generate a standard query, and a wrapper interface configured to provide the standard query to a search engine wrapper;
providing at least one search engine wrapper having a manager interface configured to provide standardized communication between the search engine manager and the search engine wrapper, a query translation module configured to translate the standard query received from the search engine manager into a native format query associated with a registered search engine, and a search engine interface configured to allow the search engine wrapper to communicate with the registered search engine in the native format of the registered search engine, wherein the at least one search engine wrapper includes a wrapper ID, wherein the search engine wrapper presents the wrapper ID to a search engine store to identify the wrapper during a registration process;
discovering at least one search engine registered with a search system by accessing the search engine store and identifying at least one search engine wrapper ID associated with the at least one search engine;
receiving a query initiated by the client accessing the search system;
building the standard query from the query initiated by the client, wherein the standard query is universally configured to be understandable by a plurality of engine wrappers;
transmitting the standard query to the plurality of search engine wrappers, wherein each search engine wrapper is configured to translate the search query into the native format that is unique to the search engine registered with the search engine wrapper; and
issuing, from each of the search engine wrappers, the unique native format query to the search engine associate with the search engine wrapper.

24. The system of claim 23, wherein each search engine wrapper is configured to issue a progress update and the wrapper ID to the search engine manager.

25. The system of claim 23, wherein the search engine manager is configured to disable issuing the standard query to a selected search engine wrapper in accordance with the search query.

26. The system of claim 23, wherein issuing the standard query to search engine wrapper is facilitated by a standardized interface.

27. The system of claim 26, wherein the standardized interface includes a COM (component object model) interface.

28. The system of claim 23, wherein the search engine wrapper is registered with the search engine manager to provide searching capabilities.

* * * * *

UNITED STATES PATENT AND TRADEMARK OFFICE
CERTIFICATE OF CORRECTION

PATENT NO.        : 7,451,136 B2  
APPLICATION NO.   : 09/927096  
DATED             : November 11, 2008  
INVENTOR(S)       : Ghim-Sim Chua et al.

Page 1 of 1

It is certified that error appears in the above-identified patent and that said Letters Patent is hereby corrected as shown below:

In column 1, line 7, delete "60/237,804," and insert -- 60/239,804, --, therefor.

In column 10, line 33, in Claim 1, delete "query" and insert -- query, --, therefor.

In column 10, line 61, in Claim 4, delete "wrappers" and insert -- wrapper --, therefor.

Signed and Sealed this  
Third Day of May, 2011

David J. Kappos  
*Director of the United States Patent and Trademark Office*